(12) United States Patent
Nonaka (10) Patent No.: US 8,895,135 B2
(45) Date of Patent: Nov. 25, 2014

(54) INTERIOR PART FOR VEHICLE

(71) Applicant: Meiwa Industry Co., Ltd., Atsugi (JP)

(72) Inventor: Kenichi Nonaka, Kani (JP)

(73) Assignee: Meiwa Industry Co., Ltd., Atsugi-shi (JP)

( * ) Notice: Subject to any disclaimer, the term of this patent is extended or adjusted under 35 U.S.C. 154(b) by 0 days.

(21) Appl. No.: 14/088,832

(22) Filed: Nov. 25, 2013

(65) Prior Publication Data

US 2014/0147638 A1      May 29, 2014

(30) Foreign Application Priority Data

Nov. 29, 2012   (JP) .................................. 2012-260691

(51) Int. Cl.
| | |
|---|---|
| *B60J 5/00* | (2006.01) |
| *B60J 9/00* | (2006.01) |
| *B28B 7/14* | (2006.01) |
| *B29C 65/00* | (2006.01) |
| *B32B 3/04* | (2006.01) |
| *B60R 13/01* | (2006.01) |
| *B29D 99/00* | (2010.01) |
| *B32B 3/02* | (2006.01) |
| *B32B 5/18* | (2006.01) |
| *B29C 51/14* | (2006.01) |
| *B29C 49/20* | (2006.01) |

(52) U.S. Cl.
CPC . *B32B 3/04* (2013.01); *B29C 51/14* (2013.01); *B60R 13/011* (2013.01); *B29C 2049/2065* (2013.01); *B29D 99/001* (2013.01); *B32B 3/02* (2013.01); *B29C 2049/2008* (2013.01); *B32B 5/18* (2013.01)

USPC ....... 428/177; 296/146.7; 296/1.08; 264/163; 264/248

(58) Field of Classification Search
CPC ............... B60R 2013/0293; B60R 2021/2076; B60R 22/22; B50R 5/04; B29C 2049/2008; B29C 2049/2065; B29C 2791/001; B29C 49/0047; B29C 49/20; B29C 51/12; B29C 51/14
USPC ........................ 296/146.7, 1.08; 428/177, 192
See application file for complete search history.

(56) References Cited

U.S. PATENT DOCUMENTS

2011/0250384 A1*  10/2011  Sumi et al. ..................... 428/118
2013/0157015 A1*   6/2013  Morris .......................... 428/167

FOREIGN PATENT DOCUMENTS

GB         2462951 A  *  3/2010  ............... B60R 5/04
JP     2008-143060 A       6/2008

\* cited by examiner

*Primary Examiner* — Prashant J Khatri
*Assistant Examiner* — Travis Figg
(74) *Attorney, Agent, or Firm* — Foley & Lardner LLP (57) ABSTRACT

A main body member, a first member, and a second member are joined together to form a laminate. A first edge of a first peripheral portion of the first member and a second edge of a second peripheral portion of second member are welded to each other along a parting line. A height position of the parting line in a thickness direction of the laminate is different between first and second portions defined in a peripheral direction of the laminate. Each of a first curvature radius of a curved shape of the first peripheral portion and a second curvature radius of a curved shape of the second peripheral portion is different between the first and second portions.

7 Claims, 9 Drawing Sheets

INTERIOR PART FOR VEHICLE

CROSS REFERENCE TO RELATED APPLICATION

This application is based upon and claims the benefit of priority from the prior Japanese Patent Application No. 2012-260691, filed on Nov. 29, 2012, the entire content of which is incorporated herein by reference.

BACKGROUND

1. Technical Field

The present invention relates to an interior part for a vehicle.

2. Related Art

Japanese Unexamined Patent Application Publication No. 2008-143060 discloses various interior parts mounted on the interior of a vehicle to improve the appearance thereof.

An interior part described in Japanese Unexamined Patent Application Publication No. 2008-143060 is a laminate made of a synthetic resin and includes a main body member, a first member joined to a top of the main body member, and a second member joined to a bottom of the main body member. In addition, a peripheral end portion of the interior part is formed to have a semi-circular cross-section.

SUMMARY

In Japanese Unexamined Patent Application Publication No. 2008-143060, a height position (a height position in a thickness direction of the laminate) of a parting line along which an edge of a peripheral portion of the first member and an edge of a peripheral portion of the second member are joined to each other is set to a constant height over the entire periphery of the laminate.

Here, there is a possibility that a large gap may be formed between the edge of the first member and a vehicle body member in a portion where the edge of the interior part is brought into contact with the vehicle body member, so that its appearance deteriorates. On the other hand, regarding a grip portion of the interior part, it is difficult to lift up the interior part by inserting lingers into the gap between the edge of the interior part and the vehicle body member.

An object of the present invention is to provide an interior part for a vehicle in which the height position of the parting line is varied, as appropriate, among predetermined portions defined in a peripheral direction of the interior part depending on the characteristics required for each of the portions.

An interior part for a vehicle in accordance with some embodiments includes: a main body member made of a synthetic resin and having a plurality of recesses and protrusions; a first member joined to a top surface of the main body member and made of a synthetic resin formed in a plate-like shape; and a second member joined to a bottom surface of the main body member and made of a synthetic resin formed in a plate-like shape. The main body member, the first member, and the second member joined together form a laminate. A first peripheral portion of the first member and a second peripheral portion of the second member have curved shapes curved toward each other. A first edge of the first peripheral portion and a second edge of the second peripheral portion are welded to each other along a parting line. A height position of the parting line in a thickness direction of the laminate is different between first and second portions defined in a peripheral direction of the laminate. Each of a first curvature radius of the curved shape of the first peripheral portion and a second curvature radius of the curved shape of the second peripheral portion is different between the first and second portions.

According to the above-described configuration, the cross-sectional shapes of the peripheral portions in the predetermined portions defined in the peripheral direction of the interior part for a vehicle can be adjusted, as appropriate, according to their required characteristics.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Hereinafter, embodiments of the present invention are described in detail with reference to the drawings.

First Embodiment

A deck board, which is an interior part for a vehicle, according to a first embodiment of the present invention is described. The deck board may be a laminate alone, which will be described later, or in a form in which a coating member is provided on an outer surface of a laminate. In this embodiment, a form of a laminate alone which is not provided with a coating member is described.

Figure 1:
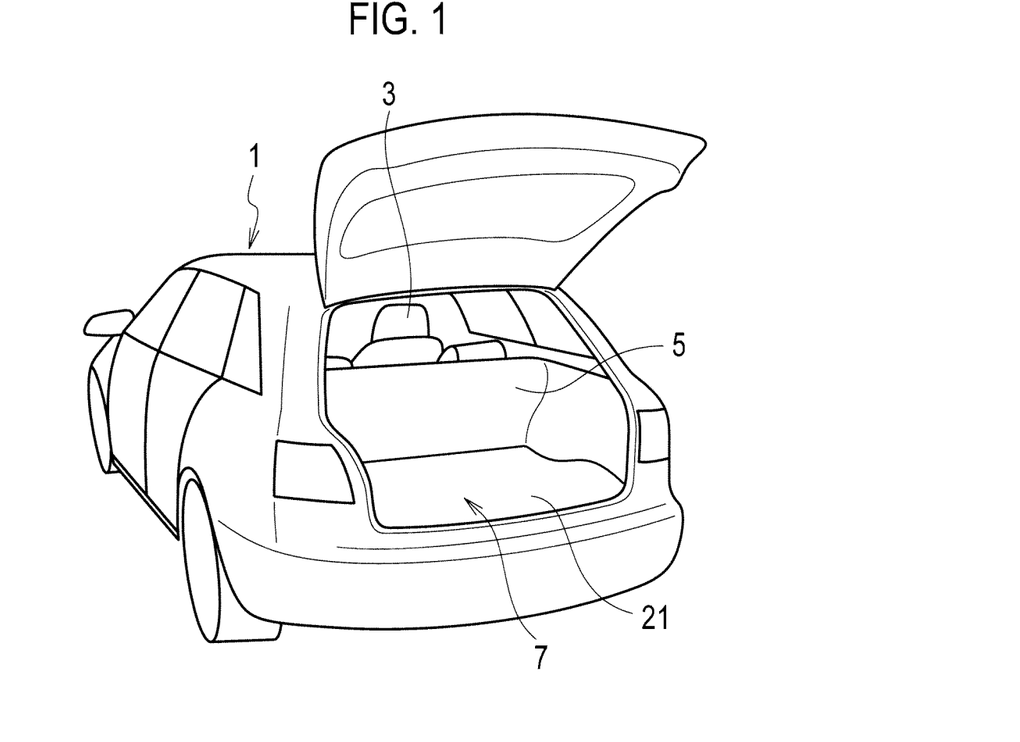
FIG. 1 is a perspective view of the inside of a vehicle in which a deck board according to a first embodiment of the present invention is disposed and which is viewed obliquely from behind.

As shown in FIG. 1, a front sheet 3 and a rear sheet 5 are provided in a vehicle interior of a vehicle 1 of the first embodiment. Behind the rear sheet 5, a trunk 7 is provided. A housing recessed portion (not illustrated) for housing a spare tire, tools, and the like is provided in a floor of the trunk 7, and a deck board 21 (an interior part for a vehicle) covering an upper opening of the housing recessed portion is provided on the housing recessed portion.

Figure 2:
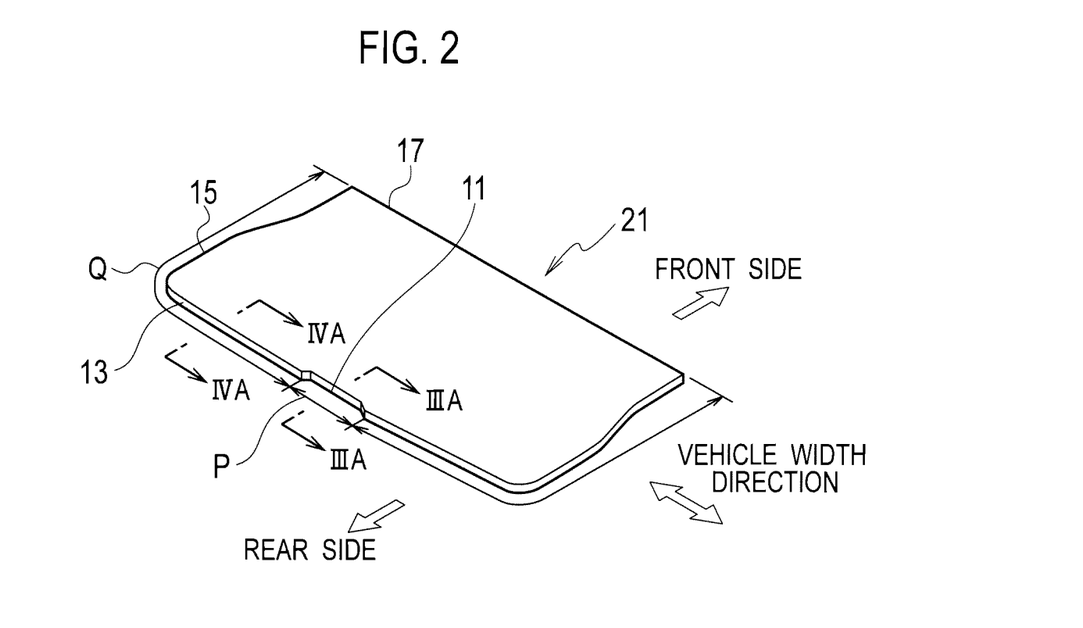
FIG. 2 is a perspective view showing the deck board of FIG. 1.

As shown in FIG. 2, the deck board 21 is formed in a substantially rectangular shape in a plan view, and formed as a plate-shaped member made of a synthetic resin, as described later. A notch portion 11 recessed frontward is formed in a central portion, in a vehicle width direction, on a rear side of the deck board 21 in a vehicle-mounted state. In a state where the deck board 21 is fitted to the housing recessed portion of the vehicle 1, a space is formed between the notch portion 11 and a vehicle body member. In detaching the deck board 21, a hand is inserted into the space, and the notch portion 11 is griped and lifted up. An edge of a general portion 13 other than the notch portion 11 on the rear side is formed linearly in a vehicle width direction in a plan view. An edge 17 of the deck hoard 21 on a front side thereof is formed linearly in the vehicle width direction. Here, of the regions defined in the peripheral direction, the region of the notch portion 11 is denoted by P, and the region including the general portion 13 and side portions 15, 15 on both left and right sides other than the notch portion 11 is denoted by Q.

Figure 3A:
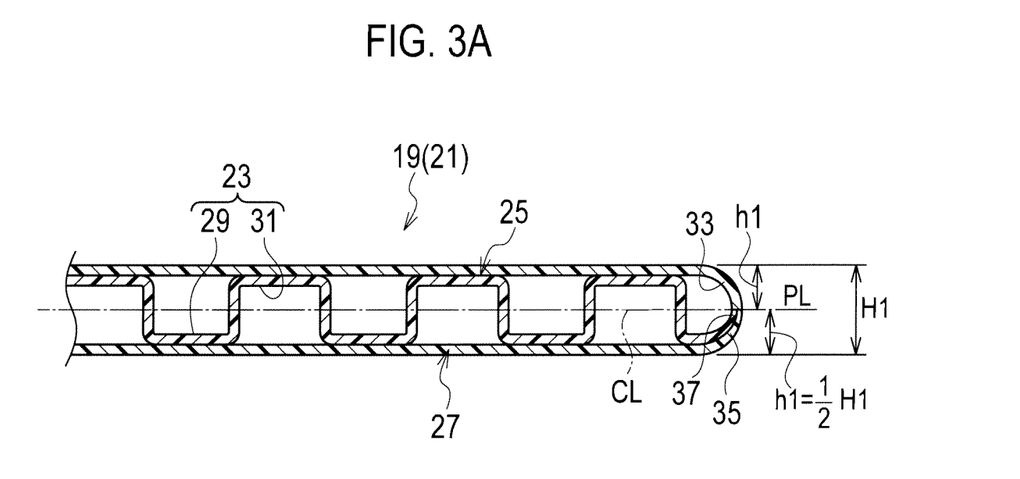
FIG. 3A is a cross-sectional view taken along the line IIIA-IIIA of FIG. 2.
Figure 3B:
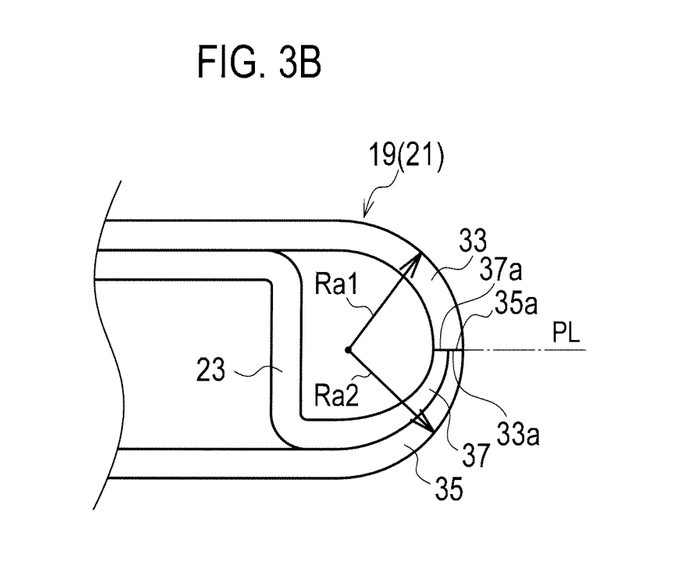
FIG. 3B is an enlarged cross-sectional view of a peripheral portion of the deck board of FIG. 3A.

As shown in FIGS. 3A and 3B, the deck board 21 (the laminate 19) according to this embodiment includes a main body member 23, a first member 25, and a second member 27.

As shown in FIG. 3A, the main body member 23 has multiple recessed portions (recesses) 29 and raised portions (protrusions) 31 and is formed of a synthetic resin. The first member 25 is joined to a top surface of the main body member 23 and is made of a synthetic resin formed in a plate-like shape. The second member 27 is joined to a bottom surface of the main body member 23 and is made of a synthetic resin formed in a plate-like shape. The main body member 23, the first member 25, and the second member 27 joined together constitute the laminate (the laminate 19). A peripheral portion 33 of the first member 25 is formed to curve to a peripheral portion 35 of the second member 27, while the peripheral portion 35 of the second member 27 is formed to curve to the peripheral portion 33 of the first member 25. A peripheral portion 37 of the main body member 23 is joined to the inside of the peripheral portion 35 of the second member 27, and formed to curve along the shape of the peripheral portion 35 of the second member 27.

As shown in FIG. 3B, an edge 33a of the peripheral portion 33 of the first member 25, an edge 35a of the peripheral portion 35 of the second member 27, and an edge 37a of the peripheral portion 37 of the main body member 23 are welded together. Here, a position where the edge 33a of the peripheral portion 33 of the first member 25 and the edge 35a of the peripheral portion 35 of the second member 27 are welded is defined as a parting line PL. In this embodiment, in the region P (see FIG. 2) including the notch portion 11 of the deck board 21, the parting line PL is, as shown in FIG. 3A, set at the same height position as a center position CL of the laminate 19 in a thickness direction thereof. Specifically, when the thickness of the laminate 19 is denoted by H1, and the height position of the parting line PL, is denoted by h1, h1=1/2×H1 holds. In addition, as shown in FIG. 3B, the curvature radius Ra1 of the peripheral portion 33 of the first member 25 is set substantially equal to the curvature radius Ra2 of the peripheral portion 35 of the second member 27.

Figure 4A:
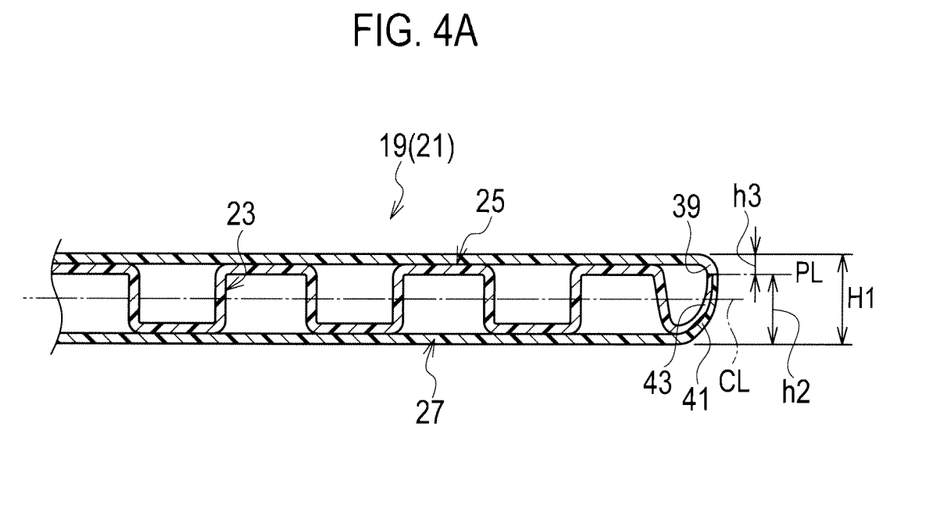
FIG. 4A is a cross-sectional view taken along the line IVA-IVA of FIG. 2.
Figure 4B:
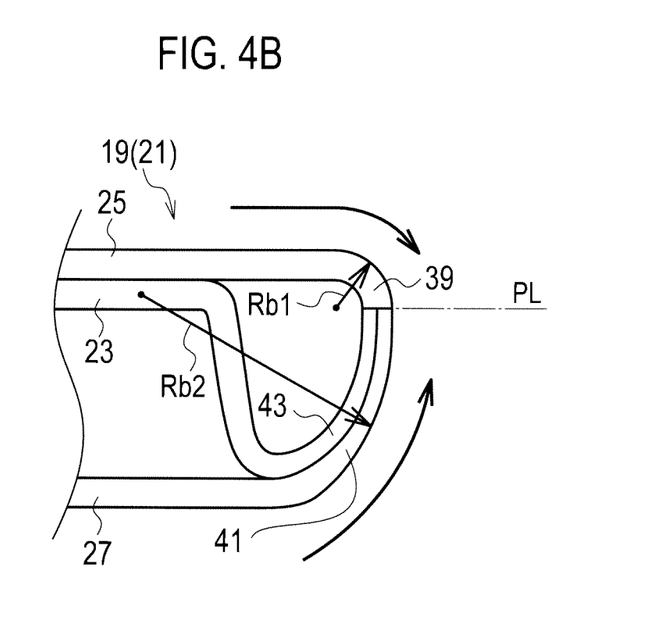
FIG. 4B is an enlarged cross-sectional view of the peripheral portion of the deck board of FIG. 4A.

As shown FIGS. 4A and 4B, the height position of the parting line PL in the region Q (see FIG. 2) is set on a first member 25 side (upper side) of the center position CL of the laminate 19 in the thickness direction thereof. Specifically, as shown in FIG. 4A, when the thickness of the laminate 19 is denoted by H1, the height from the back surface of the second member 27 to the parting line PL is denoted by h2, and the height from the parting line PL to the top surface of the first member 25 is denoted by h3, h2 is set larger than h3. In addition, as shown in FIG. 4B, a curvature radius Rb1 of a curved shape of a peripheral portion 39 of the first member 25 is set smaller than a curvature radius Rb2 of a curved shape of a peripheral portion 41 of the second member 27.

As described above, the height position of the parting line PL in the thickness direction of the deck board 21 is varied among predetermined portions defined in the peripheral direction of the deck board 21. Thus, the curvature radii Ra1, Rb1 of the curved shapes of the peripheral portions 33, 39 of the first member 25 and the curvature radii Ra2, Rb2 of the curved shapes of the peripheral portions 35, 41 of the second member 27 are varied among the predetermined portions.

Here, for example, the following synthetic resins can be used as materials for fabricating the first member 25, the main body member 23, and the second member 27: polyolefin-based resins such as low-density polyethylene, high-density polyethylene, linear low-density polyethylene, homopolypropylene, random polypropylene, and block polypropylene; copolymers of monomers thereof or copolymers of monomers thereof with other monomers; polyvinyl chloride, chlorinated polyvinyl chloride, ABS, AAS, AES, polystyrene, polyethylene terephthalate, polycarbonate, polyamide, polyvinylidene fluoride, polyphenylene sulfide, polysulfone, polyetherketone, copolymers of monomers thereof, copolymers of monomers thereof with other monomers; and the like. These materials may be used alone or in combination. As described above, various thermoplastic resins can be used. A polypropylene-based resin may be used in consideration of the balance between the costs and characteristics such as moldability, physical properties, low-temperature resistance, and heat resistance. Note that a filler may be blended as an auxiliary material for increasing the rigidity of the deck board 21. The auxiliary material is not particularly limited, and talc, calcium carbonate, or the like may be used in consideration of the balance among the costs, moldability, handleability, and the like. Since an increase in amount of the filler added may lead to the increase in costs and specific gravity, the amount of the filler added relative to the total weight may be 5 to 30% by mass in a case of talc or about 20% by mass or less in a case of calcium carbonate, in consideration of the balance thereamong. Besides the filler, an antioxidant, an ultraviolet absorber, an antistat, an antibacterial agent, a flame retardant, a light stabilizer, a lubricant, and the like may be added, if necessary. In addition, the thickness of the deck board 21 as a product may be 3 to 10 mm, and the mass per unit area thereof may be 1000 to 3000 $g/m^2$.

Next, a method for manufacturing the deck board 21 according to this embodiment is described.

Figure 5:
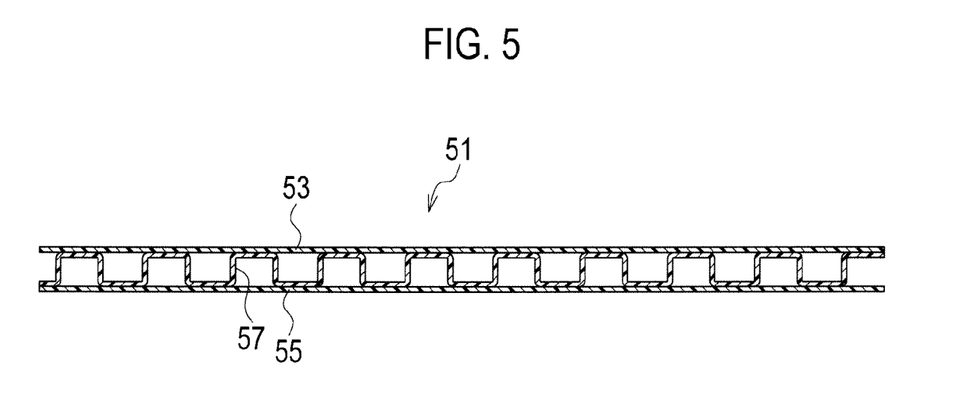
FIG. 5 is a cross-sectional view showing a laminate material used for manufacturing a deck board according to the first embodiment.

First, as shown in FIG. 5, a laminated material 51 being made of a thermoplastic resin and including a main body member 57, a first member 53 on a top surface of the main body member 57, and a second member 55 on a bottom surface thereof is prepared.

Figure 6:
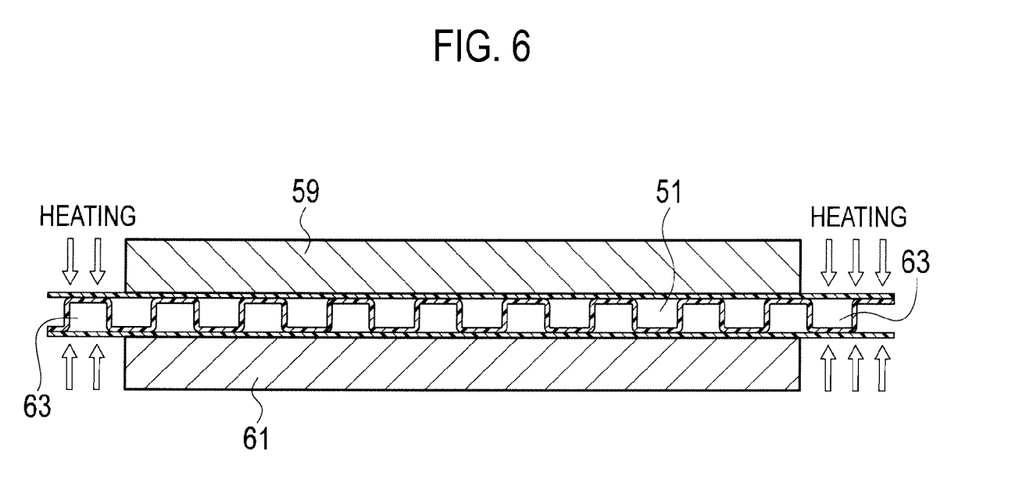
FIG. 6 is a cross-sectional view showing a state where an end portion of the laminate material of FIG. 5 is heated.

Subsequently, as shown in FIG. 6, the laminated material 51 is placed in a heating apparatus. Specifically, the laminated material 51 is placed on a lower thermal insulation plate 61, and then the laminated material 51 is held between a pair of thermal insulation plates 59, 61 from above and below. In addition, an end portion 63 of the laminated material 51 is heated with a heating unit outside the view, and thus softened.

Figure 7:
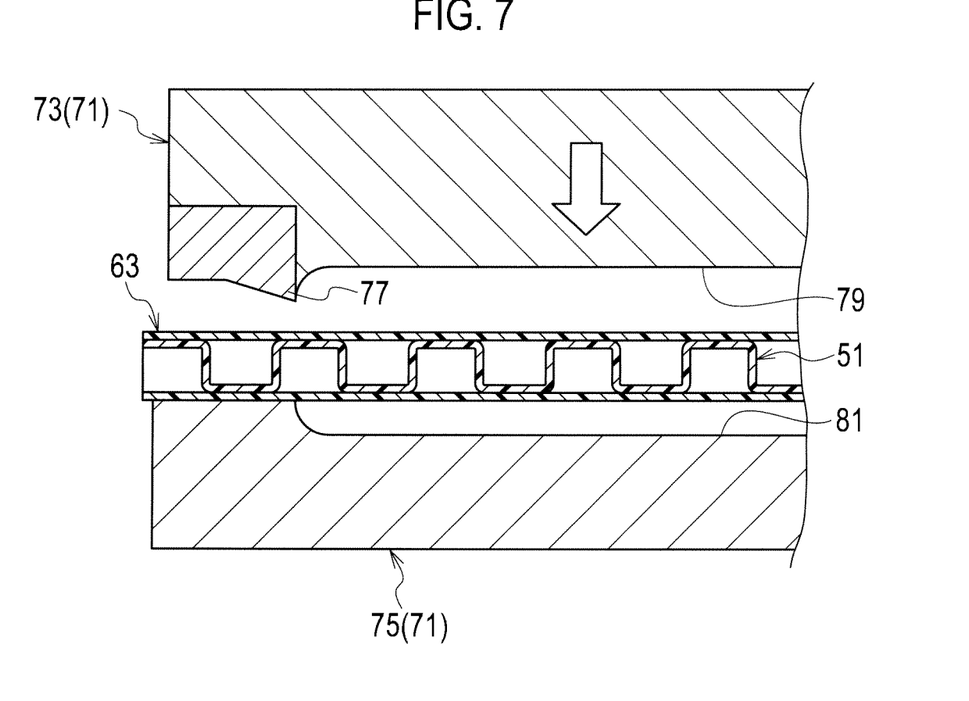
FIG. 7 is a cross-sectional view showing a state where the laminate material of FIG. 6 is placed in a die.

Next, as shown in FIG. 7, the laminated material 51 whose end portion 63 is softened is placed in a die 71. The die 71 includes an upper die 73 and a lower die 75, and a cutting blade 77 is installed on an end portion of the upper die 73. An inner surface 79 is formed on a lower side of the upper die 73, and an inner surface 81 is formed on an upper side of the lower die 75. In a state where the cutting blade 77 is brought into contact with the lower die 75 by lowering the upper die 73, a cavity having the shape of the outer surface of the laminate 19 is formed by the inner surfaces 79, 81. In FIG. 7, the laminated material 51 is placed on the lower die 75, and the upper die 73 is lowered as indicated by the arrow.

Figure 8:
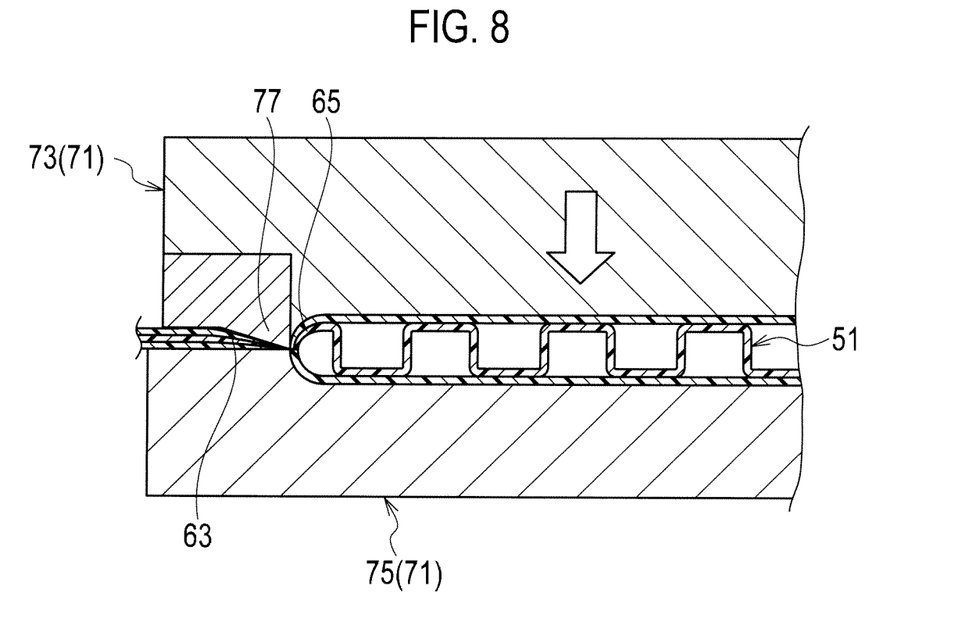
FIG. 8 is a cross-sectional view showing a state where the end portion of the laminate material is being cut with a cutting blade.

Here, since the end portion 63 of the laminated material 51 is softened by heat, the end portion 63 of the laminated material 51 is cut away by the cutting blade 77, as shown in FIG. 8. Moreover, a peripheral end portion 65 on an inner peripheral side of the end portion 63 of the laminated material 51 is formed into a curved shape along the shapes of the inner surfaces 79, 81 of the die 71.

Figure 9:
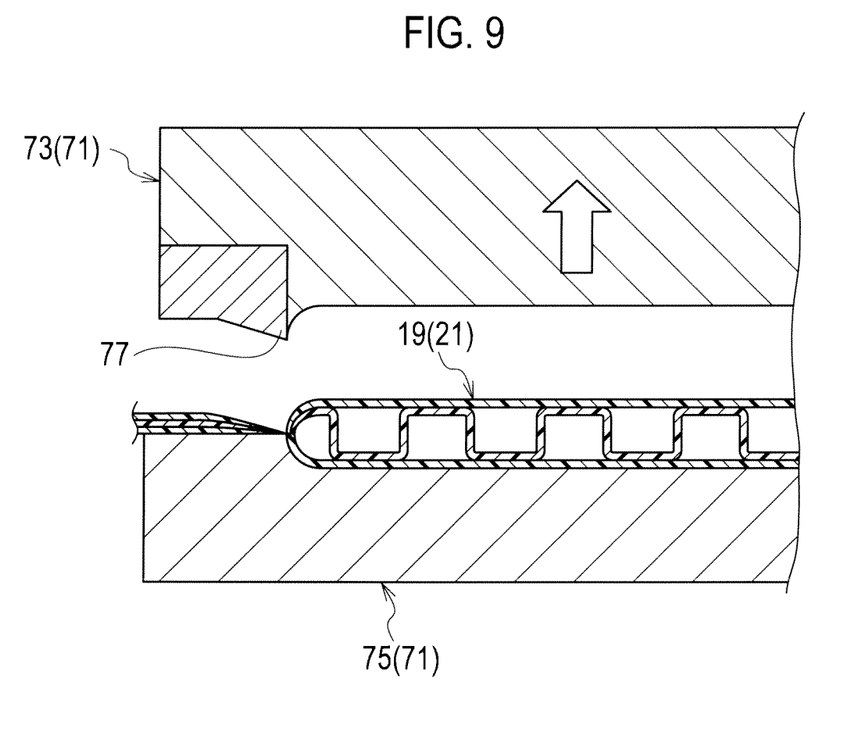
FIG. 9 is a cross-sectional view showing a state where an upper die is lifted.

Finally, as shown in FIG. 9, when the upper die 73 is lifted as indicated by the arrow, the forming of the laminate 19 (the deck board 21) is completed.

Effects of this embodiment are described below.

(1) The deck board 21 (the interior part for a vehicle) according to this embodiment includes the laminate 19 including the main body member 23 having the multiple recessed portions 29 and raised portions 31 and being made of a synthetic resin, the first member 25 joined to the top surface of the main body member 23 and made of a synthetic resin formed in a plate-like shape, and the second member 27 joined to the bottom surface of the main body member 23 and made of a synthetic resin formed in a plate-like shape.

In the deck board 21 (the interior part for a vehicle), the peripheral portions 33, 39 of the first member 25 are formed in the shapes curved toward the peripheral portions 35, 41 of the second member 27, the peripheral portions 35, 41 of the second member 27 are formed in the shapes curved toward the peripheral portions 33, 39 of the first member 25, and the edges of the peripheral portions 33, 39 of the first member 25 and edges of the peripheral portions 35, 41 of the second member 27 are welded.

The height position, in the thickness direction of the laminate 19, of the parting line PL along which the edge of the peripheral portion 33, 39 of the first member 25 and the edge of the peripheral portion 35, 41 of the second member 27 are welded is varied among predetermined portions defined in the peripheral direction of the laminate 19. Thus, the curvature radius Ra1, Rb1 of the curved shape of the peripheral portion 33, 39 of the first member 25 and the curvature radius Ra2, Rb2 of the curved shape of the peripheral portion 35, 41 of the second member 27 are varied among the predetermined portions.

Hence, the cross-sectional shapes of the peripheral portions in portions defined in the peripheral direction of the deck hoard 21 can be adjusted, as appropriate, according to their required characteristics. For example, in a portion where it is desirable that no gap be formed between the edge of the deck hoard 21 and a vehicle body member, as in the case of the region Q of FIG. 2, the height position of the parting line PL is set on the first member 25 side of the center position CL of the laminate 19 in the thickness direction thereof. Meanwhile, in a portion where fingers are inserted through a gap between the edge of the deck board 21 and the vehicle body member to detach the deck board 21 as in the case of the region P of FIG. 2, the height position of the parting line PL is set at the central position of the laminate 19 in the thickness direction thereof. Note that, in a boundary region between the region P and the region Q, the curvature radius Ra1 of the curved shape of the peripheral portion 33 of the first member 25 continuously changes to the curvature radius Rb1 of the curved shape of the peripheral portion 39. In addition, the curvature radius Ra2 of the curved shape of the peripheral portion 35 of the second member 27 continuously changes to the curvature radius Rb2 of the curved shape of the peripheral portion 41.

(2) The height position of the parting line PL in the region Q (a predetermined portion) of the laminate 19 is set on the first member 25 side of the center position CL of the laminate 19 in the thickness direction thereof. Thus, the curvature radius Rb1 of the curved shape of the peripheral portion 39 of the first member 25 is set smaller than the curvature radius Rb2 of the curved shape of the peripheral portion 41 of the second member 27.

Hence, the gap formed between the edge of the deck board 21 and the vehicle body member looks small, and the appearance quality improves. In addition, dust and the like are less likely to be accumulated between the edge of the deck board 21 and the vehicle body member.

(3) The height position of the parting line PL in the region P (a predetermined portion) of the laminate 19 is set at the central position of the laminate 19 in the thickness direction thereof. Thus, the curvature radius Ra1 of the curved shape of the peripheral portion 33 of the first member 25 is set substantially equal to the curvature radius Ra2 of the curved shape of the peripheral portion 35 of the second member 27.

Since the curvature radius Ra1 of the peripheral portion 33 of the first member 25 is substantially equal to the curvature radius Ra2 of the peripheral portion 35 of the second member 27, the deck hoard 21 can be used with either one of the top side and the bottom side used as the upper side. For example, when the deck hoard 21 is used with the top side used as the upper side for a certain period, and then with the bottom side used as the upper side, the deck board 21 can be used for a long period. In addition, it is easy to detach the deck board 21 by inserting fingers between the edge of the deck board 21 and the vehicle body member.

Second Embodiment

Next, a deck board 85 (an interior part for a vehicle) according to a second embodiment of the present invention is described. Note that portions having the same structures as those of the first embodiment are denoted by the same reference numerals, and description thereof is omitted.

Figure 10:
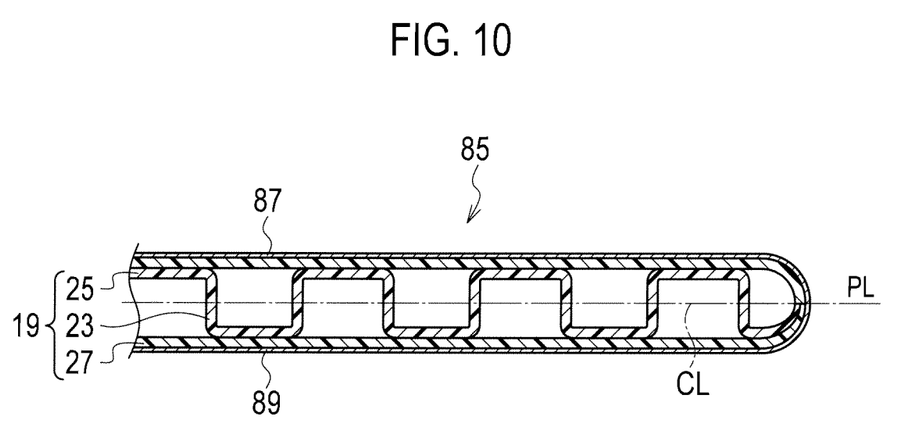
FIG. 10 is a cross-sectional view showing a deck board according to a second embodiment of the present invention.

As shown in FIG. 10, in the deck board 85 according to the second embodiment, a top surface side coating member 87 (coating member) and a bottom surface side coating member 89 (coating member) are adhered to the laminate 19 shown in FIGS. 3A and 3B. Specifically, the deck board 85 includes the laminate 19 including the main body member 23, the first member 25, and the second member 27, the top surface side coating member 87 pasted to a top side of the laminate 19, and the bottom surface side coating member 89 pasted to a bottom side of the laminate 19. Note that the parting line PL along which the first member 25 and the second member 27 are welded to each other is set at the same height position as the center position CL of the laminate 19 in the thickness direction thereof as in the case of FIGS. 3A and 3B.

As each of the top surface side coating member 87 and the bottom surface side coating member 89, a coating member such as a nonwoven fabric, a raised fabric, a synthetic leather sheet, or a synthetic resin film or any of these coating members lined with a cushion material may be used. In particular, it is possible to use a common nonwoven fabric or a needle punch nonwoven fabric being made of a polyester fiber alone or a fiber blend obtained by blending 0 to 20% by mass of a polypropylene fiber with a polyester fiber and having a mass per unit area of 20 to 500 g/m$^2$.

An effect of this embodiment is described below.

The top surface side coating member 87 (coating member) and the bottom face side coating member 89 (coating member) are provided on the outer surface of the laminate 19.

Hence, the appearance quality of the deck board 85 is improved as compared with the case where no coating member is provided.

Third Embodiment

Next, a deck hoard 91 (an interior part for a vehicle) according to a third embodiment of the present invention is described. Note that portions having the same structures as those of the first and second embodiments are denoted by the same reference numerals, and description thereof is omitted.

Figure 11A:
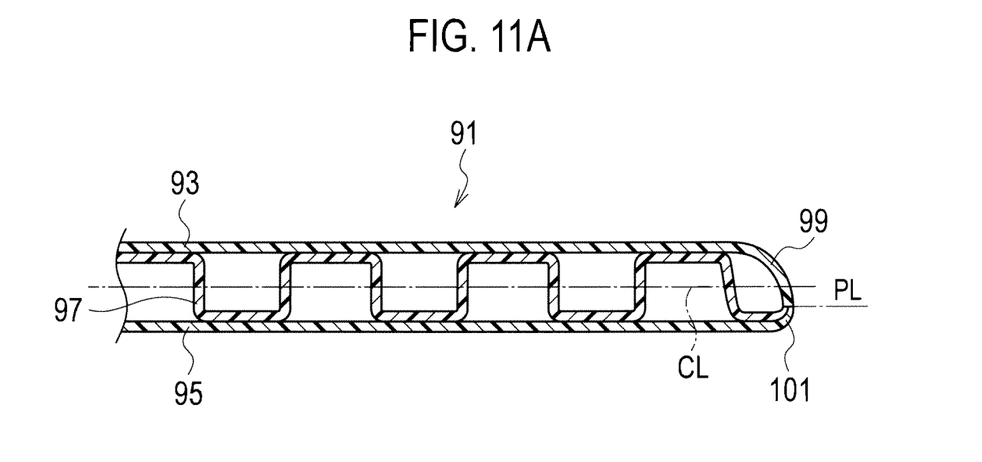
FIG. 11A is a cross-sectional view showing a deck board according to a third embodiment of the present invention.

As shown in FIG. 11A, the deck board 91 according to the third embodiment includes a main body member 97, a first member 93, and a second member 95, and the materials thereof are the same as those in the first embodiment.

Figure 11B:
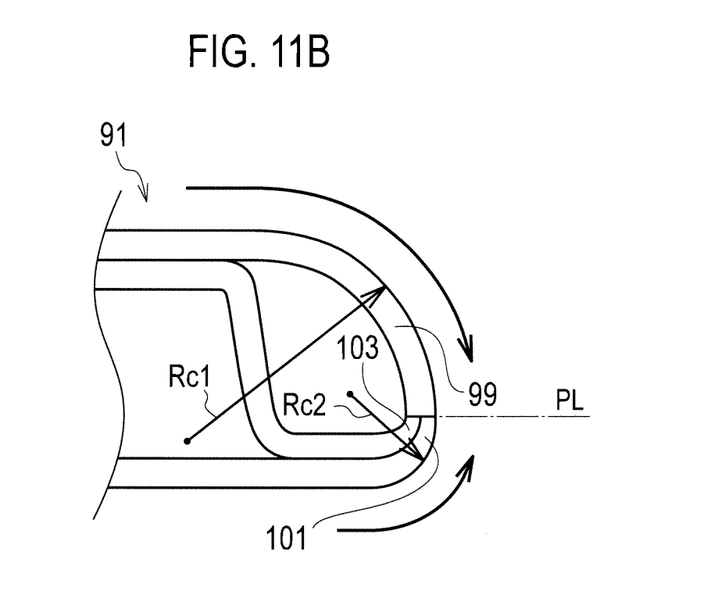
FIG. 11B is an enlarged cross-sectional view of a peripheral portion of the deck board of FIG. 11A.

As shown in FIGS. 11A and 11B, a peripheral portion 99 of the first member 93 is formed to curve to a peripheral portion 101 of the second member 95, and the peripheral portion 101 of the second member 95 is formed to curve to the peripheral portion 99 of the first member 93. Note that a peripheral portion 103 of the main body member 97 is joined to the inside of the peripheral portion 101 of the second member 95, and formed to curve along the peripheral portion 101 of the second member 95.

As shown in FIG. 11B, a height position of the parting line PL is set on a second member 95 side of the center position CL of the deck board 91 in a thickness direction thereof. A curvature radius Rc1 of a curved shape of the peripheral portion 99 of the first member 93 is set larger than a curvature radius Rc2 of a curved shape of the peripheral portion 101 of the second member 95.

An effect of this embodiment is described below.

The height position of the parting line PL in the predetermined portion of the laminate 19 is set on the second member 95 side of the central position of the laminate 19 in the thickness direction thereof. Thus, the curvature radius Rc1 of the curved shape of the peripheral portion 99 of the first member 93 is set larger than the curvature radius Rc2 of the curved shape of the peripheral portion 101 of the second member 95.

Hence, the peripheral portion 99 of the first member 93 has an appearance of a soft design, and has an improved appearance.

In addition, when a coating member is pasted onto the top side of the first member 93, the coating member is difficult to bend, if the coating member has a large thickness. Hence, a larger curvature radius Rc1 of the peripheral portion 99 is more suitable for pasting a thick coating member. Here, a vinyl chloride sheet, an olefin sheet, a carpet, or the like can be used as the coating member, for example.

Note that the present invention is not limited to the embodiments described above, and the present invention can be altered and modified in various manners. For example, the following two modifications are possible.

Modification 1

Next, a deck board 105 (an interior part for a vehicle) according to Modification 1 of the present invention is described. Note that portions having the same structures as those of the first to third embodiments are denoted by the same reference numerals, and description thereof is omitted.

Figure 12A:
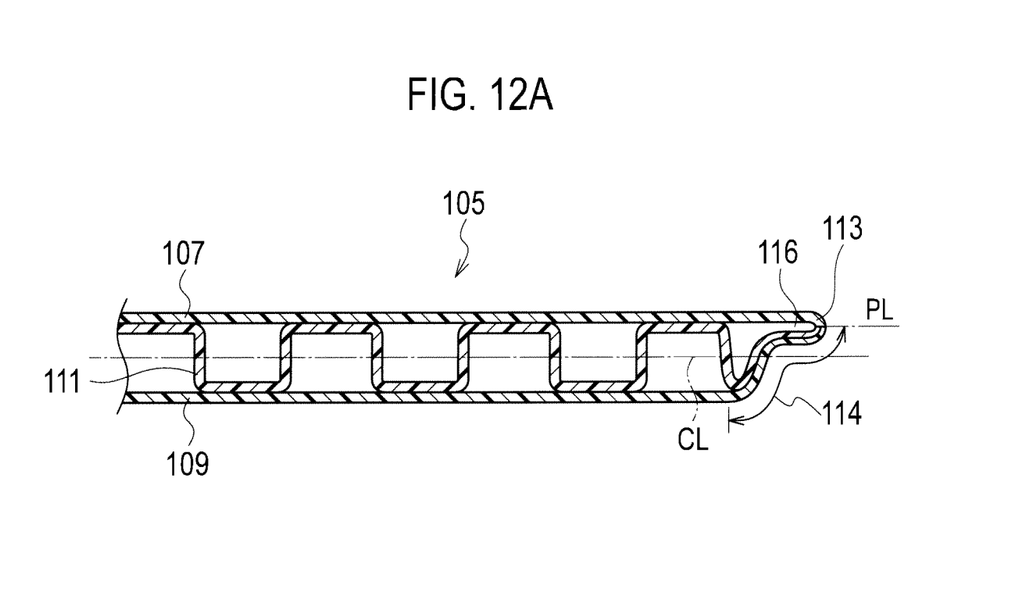
FIG. 12A is a cross-sectional view showing a deck board according to Modification 1.

As shown in FIG. 12A, the deck board 105 according to Modification 1 includes a main body member 111, a first member 107, and a second member 109, and the materials thereof are the same as those in the first embodiment.

Figure 12B:
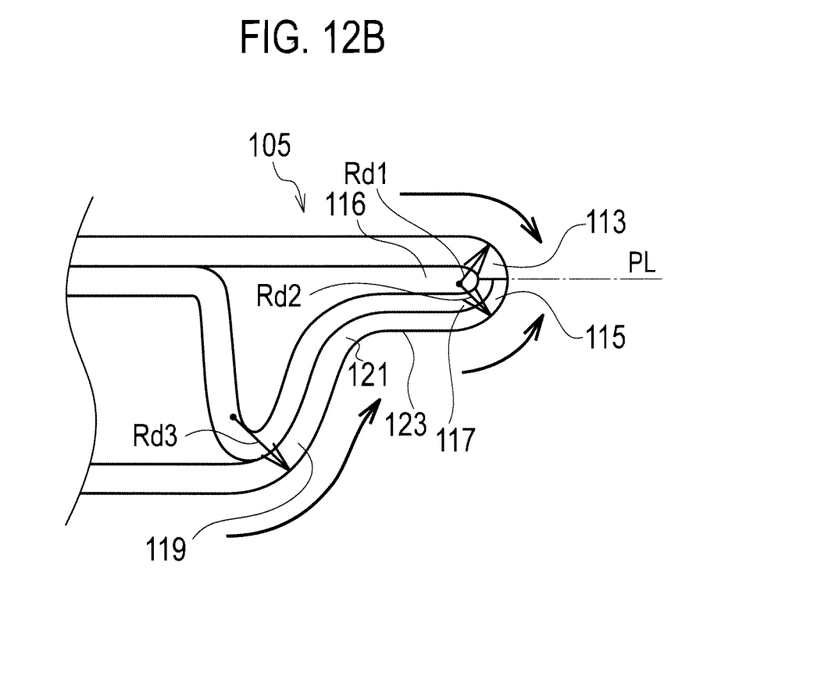
FIG. 12B is an enlarged cross-sectional view of a peripheral portion of the deck board of FIG. 12A.

As shown in FIGS. 12A and 12B, a peripheral portion 113 of the first member 107 is formed to curve to a peripheral portion 114 of the second member 109, and the peripheral portion 114 of the second member 109 is formed to curve to a peripheral portion 113 of the first member 107. Note that a peripheral portion 117 of the main body member 111 is joined to the inside of the peripheral portion 114 of the second member 109, and formed to curve along the peripheral portion 114 of the second member 109.

In particular, as shown in FIG. 12B, in the peripheral portion 114 of the second member 109, a first bent portion 119 extends to the first member 107, while being bent, a second bent portion 121 extends substantially in parallel with the first member 107, and a tip portion 115 is welded to an edge of the peripheral portion 113 of the first member 107. As described above, the peripheral portion 114 of the second member 109 has multiple bent portions (the first bent portion 119 and the second bent portion 121) formed into curved shapes. A hollow portion 116 is formed between the peripheral portion 113 of the first member 107 and the peripheral portion 114 of the second member 109. The hollow portion 116 projects in an outer peripheral direction. In the second member 109 below the hollow portion 116, a bottom surface portion 123, which is a flat portion, is formed. In addition, as shown in FIG. 12A, the height position of the parting line PL is set on a first member 107 side of the center position CL of the deck board 105 in the thickness direction thereof.

In addition, as shown in FIG. 1213, a curvature radius Rd1 of a curved shape of the peripheral portion 113 of the first member 107 is set substantially equal to a curvature radius Rd2 of a the tip portion 115 of the peripheral portion 114 of the second member 109. Moreover, a curvature radius Rd3 of the first bent portion 119 of the second member 109 is set larger than a curvature radius Rd1 of the peripheral portion 113 of the first member 107 and a curvature radius Rd2 of the tip portion 115 of the peripheral portion 114 of the second member 109.

Effects of Modification 1 are described below.

(1) The bottom surface portion 123, which is a flat portion, and the first bent portion 119 and the second bent portion 121, which are multiple bent portions formed into curved shapes, are provided in the peripheral portion 114 of the second member 109. Since the multiple bent portions are formed as described above, the rigidity of the peripheral portion 114 increases. In addition, since the bottom surface portion 123, which is a flat portion, is provided in the peripheral portion 114, it is easier to hook fingers on the bottom surface portion 123, so that the workability in detaching the deck board 105 improves.

(2) The hollow portion 116 is formed between the peripheral portion 113 of the first member 107 and the peripheral portion 114 of the second member 109, and this hollow portion 116 projects in the outer peripheral direction. Hence, the rigidity is improved by the hollow portion 116.

Modification 2

Next, a deck board 131 (an interior part for a vehicle) according to Modification 2 of the present invention is described. Note that portions having the same structures as those of the first to third embodiments and Modification 1 are denoted by the same reference numerals, and description thereof is omitted.

Figure 13A:
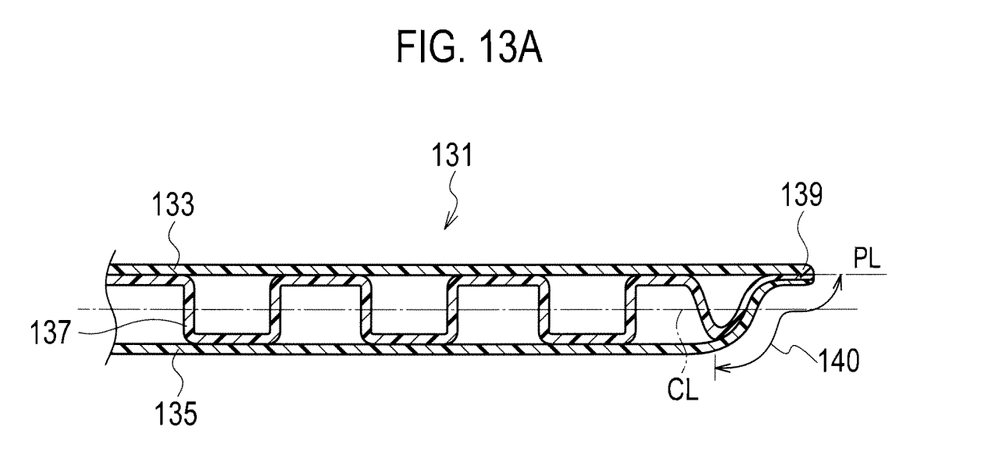
FIG. 13A is a cross-sectional view showing a deck board according to Modification 2.

As shown in FIG. 13A, the deck board 131 according to Modification 2 includes a main body member 137, a first member 133, and a second member 135, and the materials thereof are the same as those in the first embodiment.

Figure 13B:
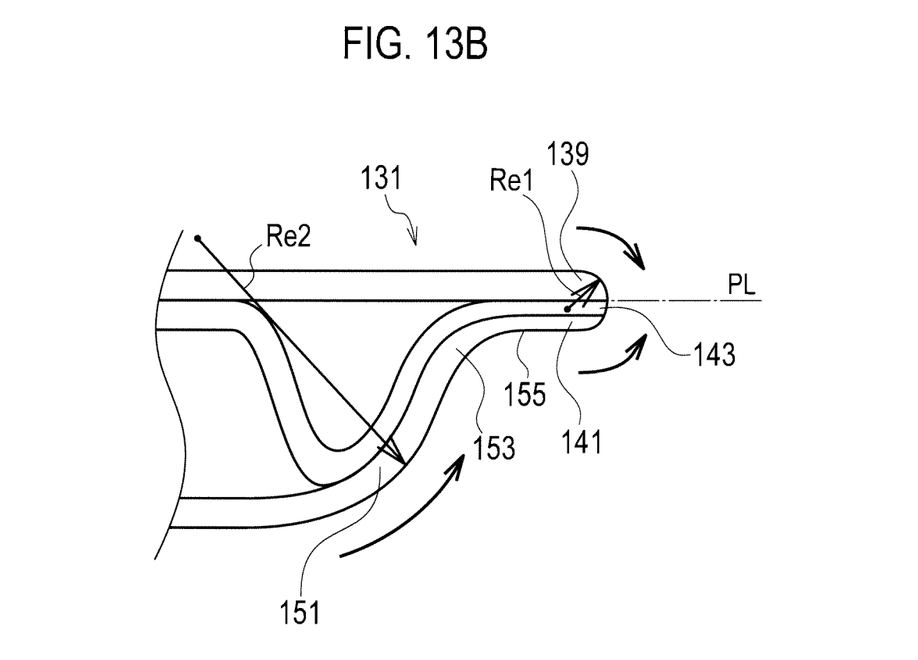
FIG. 13B is an enlarged cross-sectional view of a peripheral portion of the deck board of FIG. 13A.

As shown in FIGS. 13A and 13B, a peripheral portion 140 of the second member 135 is formed to curve to a peripheral portion 139 of the first member 133. A peripheral portion 143 of the main body member 137 is joined to the inside of the peripheral portion 140 of the second member 135, and formed to curve along the peripheral portion 140 of the second member 135.

In particular, as shown in FIG. 13B, in the peripheral portion 140 of the second member 135, a first bent portion 151 extends to the first member 133 while being bent, a second bent portion 153 extends substantially in parallel with the first member 133, and a tip portion 141 is welded to an edge of the peripheral portion 139 of the first member 133 with the peripheral portion 143 of the main body member 137 interposed therebetween. In a lower portion of the tip portion 141 of the second member 135, a bottom surface portion 155, which is a flat portion, is formed. As described above, in Modification 2, the peripheral portion 139 of the first member 133 and the peripheral portion 141 of the second member 135 arranged in vertical direction are joined to each other, and are projected in an outer peripheral direction.

As shown in FIG. 13A, a height position of the parting line PL is set on a first member 133 side of a center position CL of the deck board 131 in a thickness direction thereof. As shown in FIG. 13B, a curvature radius Re1 of a curved shape of the peripheral portion 139 of the first member 133 is set smaller than a curvature radius Re2 of a curved shape of an end portion of the second member 135. A lower surface of the peripheral portion 139 of the first member 133, the peripheral portion 143 of the main body member 137, and an upper surface of the tip portion 141 of the second member 135 are all formed to be flat. The upper surface of the tip portion 141 of the second member 135 is joined to the lower surface of the peripheral portion 139 of the first member 133, with the peripheral portion 143 of the main body member 137 interposed therebetween.

Effects of Modification 2 are described below.

(1) The bottom surface portion 155, which is a flat portion, and the first bent portion 151 and second bent portion 153, which are multiple bent portions formed into curved shapes, are provided in the peripheral portion 140 of the second member 135. Since the multiple bent portions are formed as described above, the rigidity of the peripheral portion 140 increases. In addition, since the bottom surface portion 155, which is a flat portion, is provided in the peripheral portion 140, it is easier to hook fingers on the bottom surface portion 155, so that the workability in detaching the deck board 131 is improved.

(2) The lower surface of the peripheral portion 139 of the first member 133, the peripheral portion 143 of the main body member 137, and the upper surface of the tip portion 141 of the second member 135 are all formed to be flat. In addition, the upper surface of the tip portion 141 of the second member 135 is joined to the lower surface of the peripheral portion 139 of the first member 133 with the peripheral portion 143 of the main body member 137 interposed therebetween. Hence, the joint strength among the peripheral portion 139 of the first member 133, the peripheral portion 143 of the main body member 137, and the tip portion 141 of the second member 135 is increased, so that the joining portion thereof is less likely to be separated.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An interior part for a vehicle, comprising:
   a main body member made of a synthetic resin and having a plurality of recesses and protrusions;
   a first member joined to a top surface of the main body member and made of a synthetic resin formed in a plate-like shape; and
   a second member joined to a bottom surface of the main body member and made of a synthetic resin formed in a plate-like shape, wherein
   the main body member, the first member, and the second member are joined together to form a laminate,
   a first peripheral portion of the first member and a second peripheral portion of the second member have curved shapes curved toward each other,
   a first edge of the first peripheral portion and a second edge of the second peripheral portion are welded to each other along a parting line,
   a height position of the parting line in a thickness direction of the laminate is different between a first region and a second region, wherein the first region and the second region are distinct regions each defined in a peripheral direction of the laminate,
   a first curvature radius of the curved shape of the first peripheral portion in the first region and a second curvature radius of the curved shape of the first peripheral portion in the second region are different from each other, and
   a third curvature radius of the curved shape of the second peripheral portion in the first region and a fourth curvature radius of the curved shape of the second peripheral portion in the second region are different from each other.

2. The interior part for a vehicle according to claim 1, wherein
   the height position of the parting line in the first region of the laminate is arranged toward the first member with respect to a central position of the laminate in the thickness direction, and
   the first curvature radius is smaller than the third curvature radius.

3. The interior part for a vehicle according to claim 1, wherein
   the height position of the parting line in the first region of the laminate is arranged toward the second member with respect to a central position of the laminate in the thickness direction, and the first curvature radius is greater than the third curvature radius.

4. The interior part for a vehicle according to claim 1, wherein
the height position of the parting line in the first region of the laminate is arranged at a central position of the laminate in the thickness direction, and
the first curvature radius is equal to the third curvature radius.

5. The interior part for a vehicle according to claim 1, wherein at least one of the first peripheral portion and the second peripheral portion in the second region has a flat portion and a plurality of bent portions formed into curved shapes.

6. The interior part for a vehicle according to claim 1, further comprising a coating member provided on an outer surface of the laminate.

7. The interior part for a vehicle according to claim 1, wherein
the height position of the parting line in the second region of the laminate is arranged at a central position of the laminate in the thickness direction, and
the second curvature radius is equal to the fourth curvature radius.

* * * * *